United States Patent [19]

Jones et al.

[11] Patent Number: 4,884,287

[45] Date of Patent: Nov. 28, 1989

[54] CONVERTER DEVICE FOR INTERCONNECTING SYSTEMS HAVING DIFFERENT COMMUNICATION STANDARDS

[75] Inventors: Ronald Jones, Casselberry; Michael E. Amy, Winter Springs, both of Fla.

[73] Assignee: NCR Corporation, Dayton, Ohio

[21] Appl. No.: 176,508

[22] Filed: Apr. 1, 1988

[51] Int. Cl.$^4$ .............................................. H04L 23/00
[52] U.S. Cl. .................................... 375/121; 307/110; 178/2 B; 455/343
[58] Field of Search ................... 375/121, 36; 178/2 B, 178/69 R, 69 C, 63 R; 332/1; 455/343

[56] References Cited

U.S. PATENT DOCUMENTS

| | | | |
|---|---|---|---|
| 4,403,111 | 9/1983 | Kelly | 178/69 R |
| 4,523,310 | 6/1985 | Brown et al. | 370/112 |
| 4,543,450 | 9/1985 | Brandt | 179/2 |
| 4,592,069 | 5/1986 | Redding | 375/8 |
| 4,603,320 | 7/1986 | Farago | 340/347 |
| 4,607,170 | 8/1986 | Wickman | 307/147 |
| 4,607,379 | 8/1986 | Marshall, Jr. et al. | 375/121 |
| 4,636,930 | 1/1987 | Bingham et al. | 307/110 |

OTHER PUBLICATIONS

IBM Technical Disclosure Bulletin; vol. 28, No. 6; Nov. 1985; pp. 2451–2452.
Black Box Catalog of Data Communications and Computer Devices; a Micom Company; Jul., 1985; p. 116.
Charles R. Ball, Jr., *New & Improved!* RS-232, Nov. 1988, Radio Electronics, 87–95.
Keith Nichols, *Build a Pair of Line Carrier Modems*, Jul. 1988, Radio Electronics, pp. 87–91.

*Primary Examiner*—Robert L. Griffin
*Assistant Examiner*—Marianne Huseman
*Attorney, Agent, or Firm*—Wilbert Hawk, Jr.; Stephen F. Jewett

[57] ABSTRACT

A converter device for converting signals between an RS-232 device and an RS-422 device. The converter device can either be self-powered, using signals at the I/O port of the RS-232 device to derive its operating voltages, or can be powered by an external voltage source when the I/O signals are not of sufficient magnitude to derive the operating voltages or there are a large number of devices connected in parallel by the converter device.

17 Claims, 5 Drawing Sheets

CONVERTER DEVICE FOR INTERCONNECTING SYSTEMS HAVING DIFFERENT COMMUNICATION STANDARDS

BACKGROUND OF THE INVENTION

The present invention relates to data processing systems and, more particularly, to the communications between such systems.

Various interface standards have been developed for interconnecting data processing systems. In the U.S., one of the more common standards is the RS-232 standard published by the Electronics Industry Association (EIA). Many computer devices are manufactured with Input/Output (I/O) ports or interfaces that conform to the RS-232 standard.

There are some disadvantages to an RS-232 interface. For example, because of the nature of the interface, there are limits to the distance over which communications can be established between two RS-232 devices. For this reason, some computer devices, particularly those designed to be connected to other devices over a distance of more than 15 meters, are designed with interfaces conforming to the RS-422 or RS-485 standards, also published by the Electronic Industry Association.

Since some computer devices have RS-232 interfaces and others have RS-422 or RS-485 interfaces, there is sometimes a need to connect devices having different interfaces, e.g., connecting a device with an RS-232 interface to a device with an RS-422 interface. While converter devices (sometimes referred to as "short haul modems") are commercially available for connecting such devices, they have the disadvantage of requiring an external voltage source in order to operate the circuitry in the converter device. Requiring such an external voltage, and the attendant need for equipment (such as a power supply), considerably increase the expense associated with using such converter devices.

It has been proposed to interconnect data processing devices using modems or interconnects that are self-powered, i.e., derive operating voltages from the signals on their I/O lines rather than from a separate external power source. For example, in U.S. Pat. No. 4,607,170, issued to Miles X. Wickman, there is shown an interconnection device for interconnecting two devices having RS-232 interfaces. The interconnection device has a diode-capacitor network which provides an operating or supply voltage for the circuitry within the device, with the supply voltage derived from the signals available at the I/O ports of the interconnected equipment. However, the interconnection device shown in Wickman is not useable between devices having different interface standards (e.g., an RS-232 device and an RS-422 device) and further has a disadvantage that the signals available at the I/O port of the interconnected equipment may sometimes not have sufficient signal strength from which to derive an adequate operating voltage.

This is a particular problem when one connects a single device of one standard (e.g., a computer having a RS-232 interface) to a multiplicity of devices having a different standard (e.g., terminals each having an RS-422 interface). The operating voltages or power that can be derived from the signal lines (e.g., at the RS-232 interface) may not be sufficient to generate an operating voltage for driving the signal lines leading to each of the terminals. Furthermore, there are ranges of signal strength that conform to the published standards. For example, under the RS-232 standard, the I/O signal lines are permitted to have voltage ranges as small as $-5$ V to $+5$ V, or as large as $-12$ V to $+12$ V. While a signal having an amplitude of $+12$ V may be adequate to derive operating voltages, a signal having an amplitude of only $+5$ V may not.

SUMMARY OF THE INVENTION

There is provided, in accordance with the present invention, a converter device for interconnecting two data processing devices or systems having interfaces conforming to different communication standards. The converter device is capable of deriving the operating voltages for the device from the input/output (I/O) signals available at one interface so that no external power source is needed. In addition, there is provided means in the converter device for receiving external power in order to also provide the operating voltages for the device, so that the converter device can be operated either with or without an external power source.

In particular, there is provided in accordance with the present invention a converter device for interconnecting a first data processing system having an interface conforming to a first communication standard, such as RS-232, to a second data processing system having an interface conforming to a second communication standard, such as RS-422, with the converter device including deriving means, in the form of a diode-capacitor and voltage regulator circuit for receiving a non-power signal from the first-data processing system and deriving an operating voltage for operating the converter device from the non-power signal, and external voltage means, in the form of a terminal connected to the diode-capacitor and voltage regulator circuit, for connecting the converter device to an external voltage, so that the deriving means may provide operating voltages for the device either derived from the non-power signal or from the external voltage.

It is, therefore, an object of the present invention to provide a converter device for interconnecting two data processing systems.

It is another object of the present invention to provide a converter device for connecting two data processing systems conforming to a different communications standards.

Still a further object of the present invention is to provide a converter device of the type described above which can operate, when needed, either with or without an external voltage or power source.

These and other objects of the present invention will be apparent from the following description and the attached drawings.

DESCRIPTION OF THE PREFERRED EMBODIMENT

Figure 1:
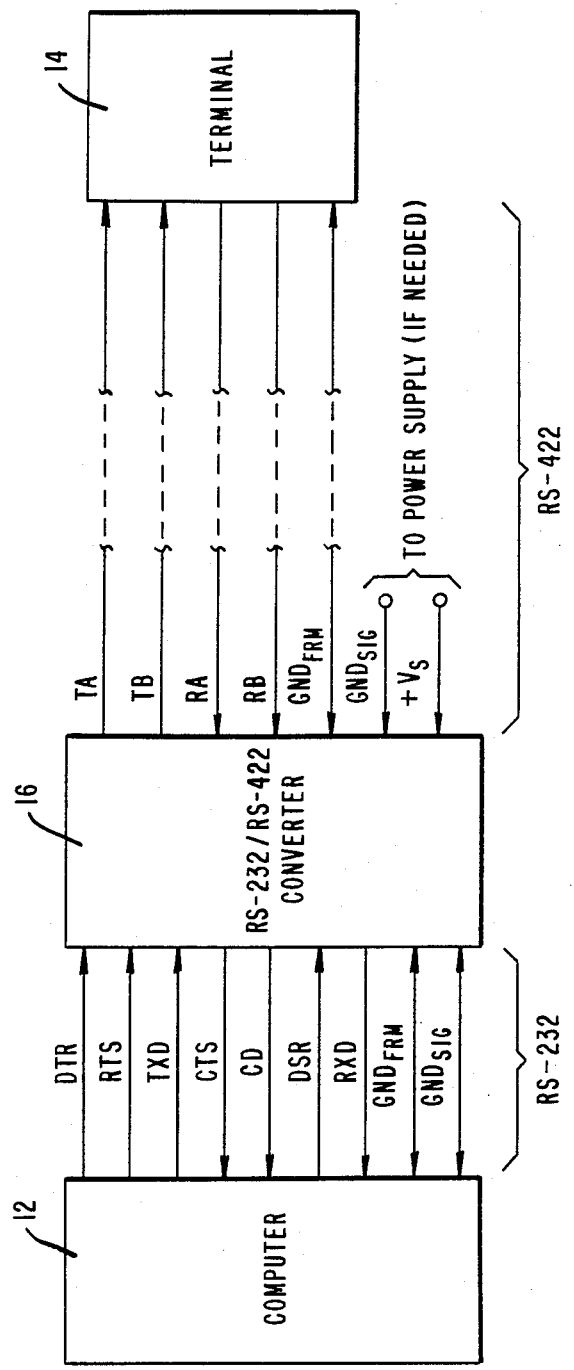
FIG. 1 is a block diagram showing a computer and a terminal connected by a converter device in accordance with the present invention.

Referring now to FIG. 1, a data processing system 10 is shown as including a computer 12 connected to a terminal 14. The computer 12 has a communication interface which conforms to the RS-232 standard and the terminal 14 has a communication interface which conforms to the RS-422 standard. The terminal 14 may represent any type of input/output device, such as a data entry terminal. Particularly, terminal 14 could be an NCR 4450 Terminal and the computer 12 could be a personal computer, such as an NCR PC 4, both of which are commercially available from NCR Corporation, Dayton, Ohio.

Computer 12 and terminal 14 are connected by an RS-232/RS-422 converter device 16 in accordance with the present invention. The converter device 16 is connected for converting I/O signals in accordance with the RS-232 interface standard at the computer 12 to I/O signals in accordance with the RS-422 interface standard at the terminal 14.

The I/O signals between the computer 12 and converter device 16 are in accordance with the RS-232 standard, and are conventionally designated as DTR (Data Terminal Ready)
RTS (Request to Send)
TXD (Transmitted Data)
CTS (Clear to Send)
CD (Carrier Detect)
DSR (Data Set Ready)
RXD (Received Data)
$GND_{FRM}$ (Frame or Chassis Ground)
$GND_{SIG}$ (Signal Ground)

The I/O signals between the converter device and terminal 14 are in accordance with the RS-422 standard, and are conventionally designated as TA (Positive Transmitted Data)
TB (Negative Transmitted Data)
RA (Positive Received Data)
RB (Negative Received Data)
$GND_{FRM}$ (Frame or Chassis Ground)
$GND_{SIG}$ (Signal Ground)

The above signals are all provided for in the RS-232 and RS-422 standards, and are otherwise well known to those skilled in the art. Further information concerning the nature of the signals can be obtained by reference to such standards.

There is also shown, connected to the RS-422 side of converter device 16, a line connected for receiving a voltage $+V_S$ from an optional external power supply (not shown) at terminal 14. The signal ground ($GND_{SIG}$) line from converter device 16 is also connected to the external power supply. As will be described in greater detail later, the voltage $+V_S$ supplies power to the converter device 16 when the converter device 16 is not self-powered, i.e., not deriving operating voltages from the signals received from the RS-232 interface of the computer 12. As will also be described later in conjunction with FIG. 4, while the terminal 14 is illustrated as a device having an RS-422 interface, the terminal 14 could have an RS-485 interface and still be connected to computer 12 by way of the converter device 16. Further, while only a single terminal 14 is shown in FIG. 1, the converter device 16 could connect computer 12 to a plurality of terminals 14, each connected in parallel at the RS-422 side of converter device 16.

The converter device 16 has circuitry (to be described later) which permits the converter device 16 to be either (1) operated without an external power supply, the necessary operating voltages being derived from the control signals DTR and RTS and the data signal TXD, or (2) in circumstances where such signals are not capable of supplying sufficient power to operate converter device 16 (which would be determined by the user of the system 10 before the device 16 is put in use), powered by the voltage $+V_S$. In applications where the voltage amplitude of the signals DTR, RTS and TXD is determined to be near the top of the voltage range specified in the RS-232 standard (i.e., +12 volts) and there are no more than a few terminals 14 connected to computer 12, the external voltage $+V_S$ is not connected to converter device 16 and is not needed to generate the necessary operating voltages within converter device 16. However, in cases where the voltage amplitude of the signals DTR, RTS and TXD is determined to be near the low end of the voltage range specified in the RS-232 standard (i.e., +5 V), or in cases where there are a large number (i.e., thirty or more) of terminals 14 connected to the computer 12 through the converter device 16, the operating voltages for the converter device are provided by $+V_S$ and the external power supply supplying such voltage must be connected to the converter 16.

Figure 2A:
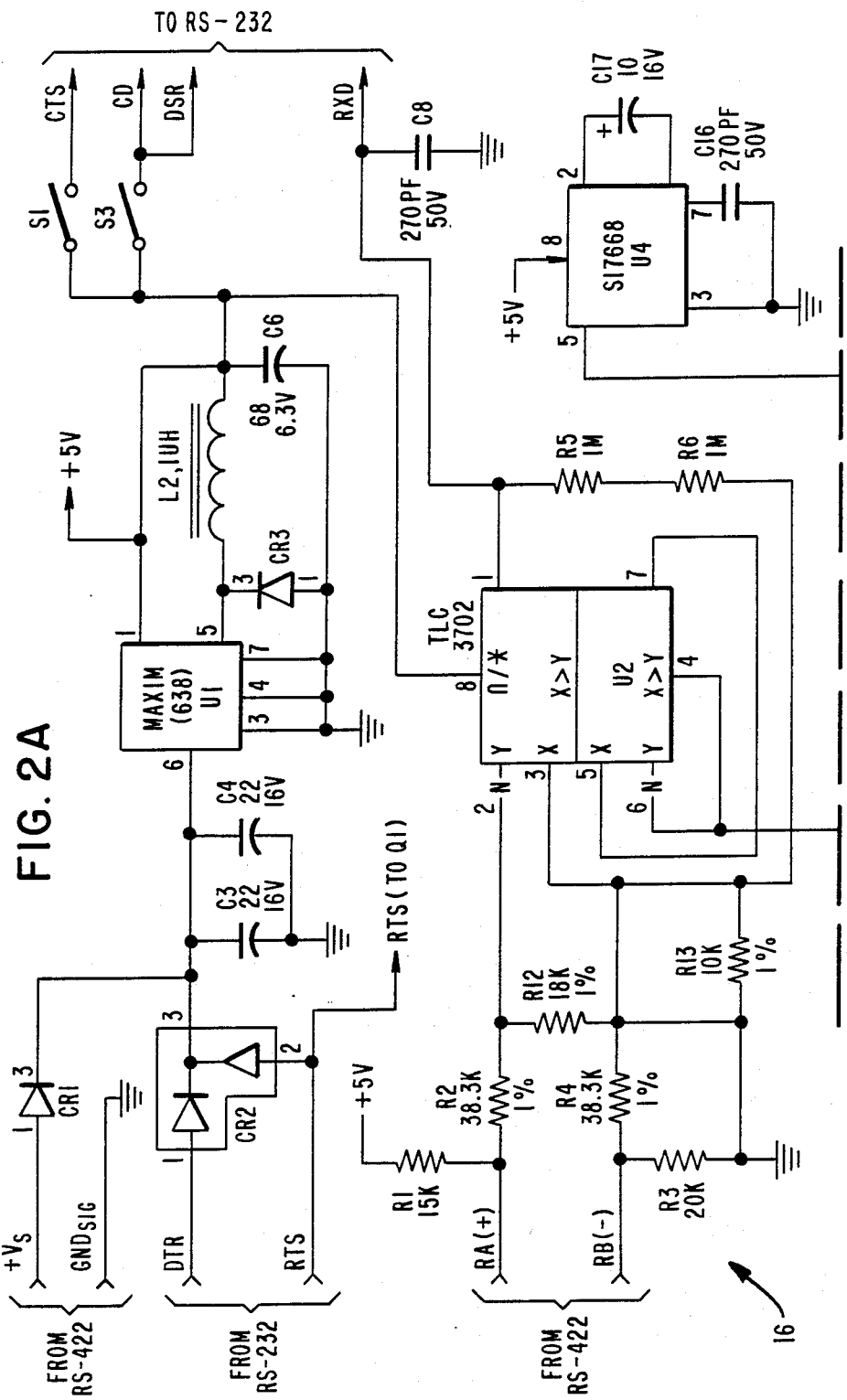
FIGS. 2A and 2B are a circuit diagram of the converter device seen in FIG. 1.
Figure 2B:
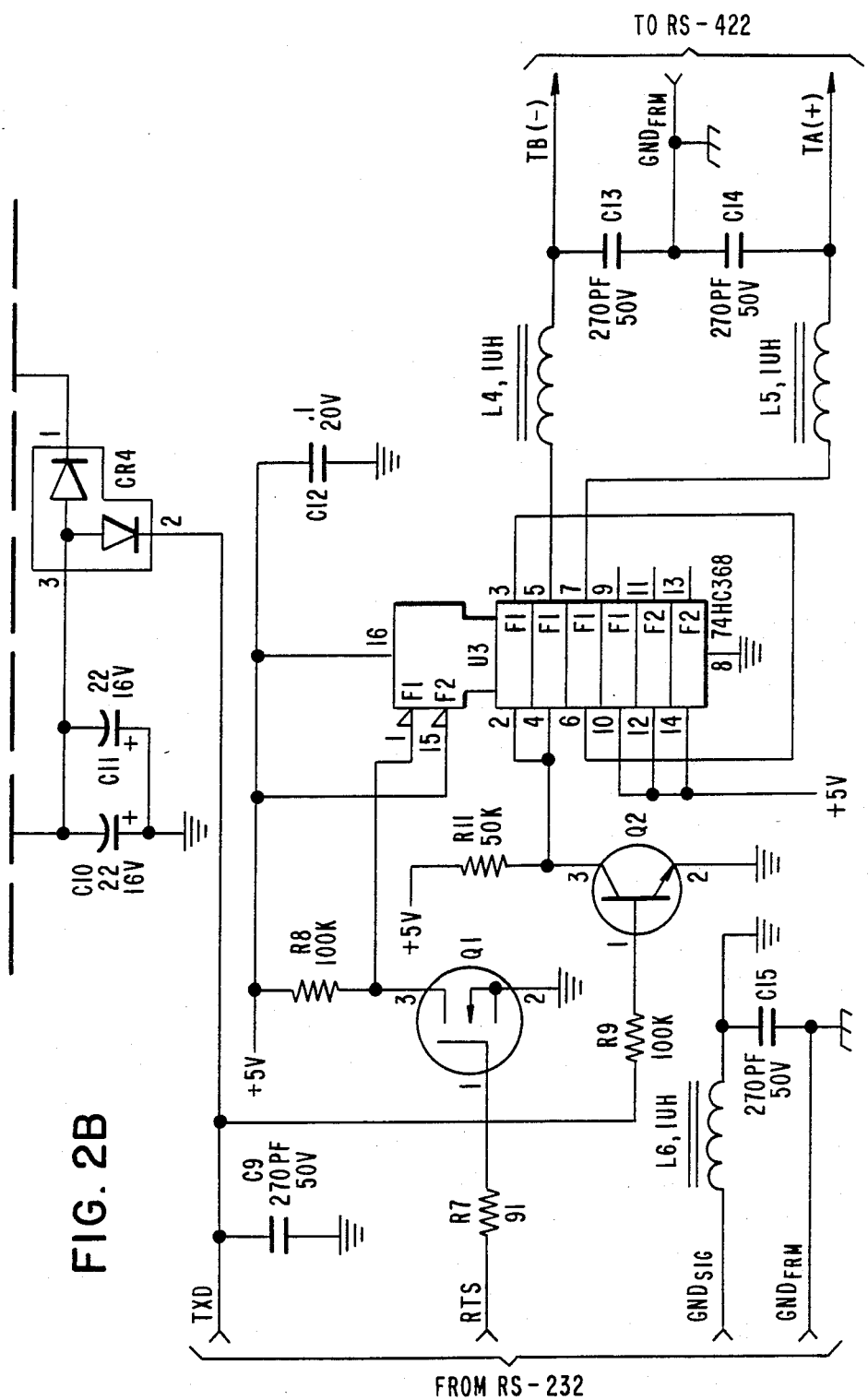

Turning now to FIGS. 2A and 2B, there is shown a circuit diagram of the converter device 16.

The Data Terminal Ready (DTR) and Request To Send (RTS) signals from the RS-232 interface are provided by way of a Schottky diode pair CR2 to the anodes of two bulk storage capacitors C3 and C4. The cathodes of the capacitors C3 and C4 are connected to ground. The positive voltage across the capacitors C3 and C4 is provided to pin 6 of a voltage regulator U1 which, as illustrated in FIG. 2A, is a CMOS step-down switching regulator MAX638, commercially available from Maxim Integrated Products, Sunnyvale, Calif. As seen in FIG. 2A, the voltage $+V_S$ from an external power supply (not shown) at the terminal 14 is also provided to the anodes of the capacitors C3 and C4 by way of a diode CR1. Associated with the voltage $+V_S$ is signal ground ($GND_{SIG}$) also from the RS-422 interface which is provided to ground at the converter device 16.

The voltage regulator U1 is grounded at its pins 3, 4 and 7. Its output at pin 1 provides a constant +5 V power signal which is used as a positive operating voltage for other circuit components (to be described below) within the converter device 16. In order to conventionally configure voltage regulator U1 as a step-down voltage regulator, the output at pin 5 of the voltage regulator U1 is tied to pins 3, 4 and 7 and to ground by way of a fly back diode CR3 and also to the +5 V output at pin 1 by way of an inductor L2. The output at pin 1 is also connected to ground by way of a bulk storage capacitor C6, which stabilizes the +5 V output.

Two switches S1 and S3 connect the output of the voltage regulator U1 to the Clear To Send (CTS), Carrier Detect (CD) and Data Set Ready (DSR) signal lines going to the RS-232 interface at computer 12. The switches S1 and S3 are manually set in either an open or closed condition when the computer 12 is connected to the terminal 14, depending on the signal requirements of the computer 12. When the switches S1 and S3 are closed, the converter device 16 supplies a constant +5 V as the signals CTS, CD and DSR, if such signals are required at the RS-232 interface of the computer 12. If such signals are not required, the switches S1 and S3 are set open.

The differential data signals received from the RS-422 interface, Positive Received Data (RA) and Negative Received Data (RB), are provided by way of a resistor network (R1, R2, R3, R4, R12 and R13) to the pins 2 and 3 of a comparator U2. The resistor network is conventional for an RS-422 interface, with the values of the resistors chosen to ensure RS-422 compatibility.

Comparator U2, as illustrated in FIG. 2A, is a dual differential comparator TLC3702, commercially available from Texas Instruments Incorporated, Dallas, Tex. The positive operating voltage at pin 8 of the comparator is the +5 V output supplied from the voltage regulator U1. The negative operating voltage for the comparator U2 is provided at pins 4 and 6 by bulk storage capacitors C10 and C11, which will be described in greater detail below.

The output of the comparator U2 at pin 1 is tied to the input at pin 3 by way of a feedback path which includes resistors R5 and R6. The output at pin 1, which is also connected to ground by way of a filtering capacitor C8, provides the Received Data (RXD) signal, such signal representing the data received at the converter device 16 from terminal 14 at its RS-422 interface and converted into the format necessary for the RS-232 interface for presentation to the computer 12.

The negative operating voltage needed for converter device 16 is derived from the Transmitted Data (TXD) signal from the RS-232 interface. The TXD signal represents the data being transmitted by computer 12 for terminal 14, and will frequently change between high ("1") and low ("0") logic levels. As seen in FIG. 2B, the TXD signal is received on a signal line from the RS-232 interface, such line connected to ground by way of a capacitor C9 and also connected to one cathode of a Schottky diode pair CR4. The other cathode of the Schottky diode pair CR4 is connected to the output pin 5 of an inverter U4. As shown in the drawings, inverter U4 is an inverter S17668, commercially available from Siliconix, Inc., Santa Clara, Calif. The input pin 8 of inverter U4 is connected for receiving the +5 V output from the voltage regulator U1. Pins 2 and 4 of inverter U4 are tied together by way of a capacitor C17, and pins 3 and 7 are tied to ground, with pin 3 tied directly and with pin 7 tied by way of a capacitor C16.

The anodes of the Schottky diode pair CR4 are connected to the cathodes of the two bulk storage capacitors C10 and C11, with the anodes of capacitors C10 and C11 connected to ground. The arrangement of capacitors C10 and C11, Schottky diode pair CR4 and inverter U4, cause a relatively constant negative voltage to appear across the capacitors C10 and C11. When the signal TXD is at a low logic level, the negative voltage associated with that logic level causes current flow from ground through capacitors C10 and C11 and a negative voltage to appear across the capacitors C10 and C11. Also, the +5 V operating voltage at the input of inverter U4 is changed into a −5 V signal at the output pin 5 of the inverter U4, also causing a negative voltage to appear across capacitors C10 and C11. Thus, it can be seen that the negative operating voltage for the converter device 16 can be held at a negative voltage level across capacitors C10 and C11, with that negative operating voltage primarily derived from the TXD signal when it is low, and with the voltage across capacitors C10 and C11 held at a negative level by the output of inverter U4 when TXD rises to its high logic level.

The TXD signal is also provided to the base of a transistor Q2 (FIG. 2B) by way of a biasing resistor R9. The emitter of Q2 is tied to ground and the collector is connected by way of a resistor R11 to the +5 V operating voltage supplied by the output of voltage regulator U1. The transistor Q2 switches in response to logic level changes in the TXD signal (representing data at the RS-232 interface from computer 12), with the resulting voltage across the emitter-collector junction of Q2 provided to the input pins 2 and 4 of an amplifier U3. As illustrated in FIG. 2B, amplifier U3 is a hex bus driver 74HC368, commercially available from Texas Instruments. Amplifier U3 provides a pair of differential output signals at its output pins 5 and 7, with the signal at pin 5 passed through a filtering inductor L4 to become the Negative Transmitted Data (TB) signal, and the output signal from pin 7 being passed through a filtering inductor L5 to become the Positive Transmitted Data (TA) signal. The signal lines providing TA and TB are tied together by filtering capacitors C13 and C14, with the juncture of C13 and C14 grounded to the frame or chassis of the converter device 16. The juncture of C13 and C14 also receive the frame ground ($GND_{FRM}$) signal from terminal 14.

The differential signals TA and TB are the differential data signals provided by the converter device 16 at its RS-422 interface to terminal 14, representing the data provided by the TXD signal at the RS-232 interface from computer 12, but converted into the RS-422 format.

The enable input F2 at pin 15 of U3 as well as pin 16 of U3 are connected for receiving the +5 V operating voltage from the output of voltage regulator U1. These same two pins are connected to ground by way of a capacitor C12.

The amplifier U3 is enabled to provide the TA and TB signals by an N-channel MOSFET device Q1 which receives the Request To Send (RTS) signal from the RS-232 interface. The device Q1 receives the RTS signal at its gate by way of a resistor R7. The source of device Q1 is tied to ground, and the drain of device Q1 is connected to the +5 V operating voltage from voltage regulator U1 by way of a resistor R8. The drain is also connected to the enable input F1 at pin 1 of amplifier U3. Amplifier U3 is thus enabled when its F1 input at pin 1 is grounded. Pin 1 is grounded when the signal RTS provided at the gate of Q1 goes high, causing a low impedance across the drain-source junction of Q1. When U3 is enabled, the differential signals TA and TB are provided by way of the inductors L5 and L4 from the output pins 5 and 7 of U3.

The pins 10, 12 and 14 of U3 are connected to receive the +5 V operating voltage from voltage regulator U1. Pin 8 of U3 is tied to ground, and pins 3 and 6 are tied together to form a feedback loop.

As also seen in FIG. 2B, the signals frame ground ($GND_{FRM}$) and signal ground ($GND_{SIG}$) are received by the converter device 16 at its RS-232 interface from computer 12. The signal $GND_{SIG}$ is provided by way of an low noise filtering inductor L6 to ground. The signal $GND_{FRM}$ is provided to the chassis or frame ground, with the frame and signal grounds tied together by way of a capacitor C15.

In operation, when the Data Terminal Ready (DTR) and/or Request To Send (RTS) signals go high, indicating that the computer 12 is ready to transmit data or that the computer 12 is requesting data from the terminal 14, the bulk storage capacitors C3 and C4 are charged by way of Schottky diode pair CR2 to a positive voltage, which in turn is provided to the voltage regulator U1 in order to provide the +5 V positive operating voltage for the various components within converter device 16. In order to provide a negative operating voltage, the Transmit Data (TXD) signal will, as data is being transmitted from reflecting the data being transmitted. The low logic level signals are passed through the Schottky diode pair CR4, causing a negative voltage (approximately −8 V) to appear across the bulk storage capacitors C10 and C11 and providing a negative operating voltage. To ensure that the negative operating voltage is uninterrupted, particularly in instances where TXD is not frequently at its low logic level, the inverter U4 receives the +5 V operating voltage from voltage regulator U1 and supplies a −5 V voltage by way of Schottky diode pair C4 to the capacitors C10 and C11.

Differential signals RA and RB, representing data received from the terminal 14, are passed through the comparator U2 by way of the voltage divider network (R1, R2, R3, R4, R12 and R13) and appear at the output of comparator U2 as the RXD signal, reflecting the data received from terminal 14 but converted into the RS-232 format.

Data to be transmitted from the computer 12 to terminal 14 is provided to the converter device 16 as the signal TXD, which is passed by way of transistor Q2 to the differential amplifier U3. Amplifier U3 provides the differential data signals TA and TB (by way of inductors L4 and L5) to the terminal 14, such signals being in the RS-422 format. The Request To Send (RTS) signal, which is the signal from computer 12 indicating its desire to transmit data to the terminal 14, enables the amplifier U3 by way of the MOSFET device Q1.

As is provided in the RS-232 standard, the voltage level of the signals at the RS-232 interface are permitted to be within the ranges of +5 V to +12 V for a "1" or high logic level and −5 V to −12 V for a "0" or low logic level. To properly power converter device 16, it is preferred that the signals DTR and RTS all be near the +12 V for "1", and that the signal TXD be near −12 V for "0".

In some circumstances, as noted earlier, it may not be possible to use the signals DTR and RTS to generate the +5 V operating voltage at the output of voltage regulator U1. Particularly, if a +12 V power source is not used to drive the RS-232 interface at computer 12 (FIG. 1), the voltage magnitude of the DTR and RTS signals will not be sufficient to drive voltage regulator U1. In such circumstances, the system may be configured to receive the external voltage $+V_S$ by way of diode CR1. $+V_S$ has a value of +12 V, and such voltage appears across the storage capacitors C3 and C4 and at pin 6 of voltage regulator U1.

Another circumstance where the external voltage $+V_S$ is required is when a large number of terminals 14 are connected in parallel to computer 12 by converter device 16. It has been found, in the particular circuit configuration shown in FIGS. 2A and 2B, that when more than thirty terminals 14 are connected in parallel, there is insufficient power to generate the operating voltage at the output of voltage regulator U1 from the signals DTR and RTS in order to drive all of the signal lines to the terminals 14, and hence the external voltage $+V_S$ is required.

It can thus be seen that, in accordance with the present invention, converter device 16 can either be self-powered (i.e., derive its operating voltages from the RS-232 signals DTR, RTS and TXD) or, when the configuration of system 10 requires, have its operating voltages provided by the external voltage $+V_S$.

Also, while in the illustrated embodiment, the converter device 16 converts between an RS-232 interface and the RS-422 interface, converter device 16 can easily be made to convert between an RS-232 interface and an RS-485 interface. For the RS-485 interface, the signal lines for TA and TB are tied together and the signal lines for RA and RB are tied together. When the signal lines are tied together as described, RS-232 signals are converted into half-duplex communication signals as required for the RS-485 interface.

Figure 3:
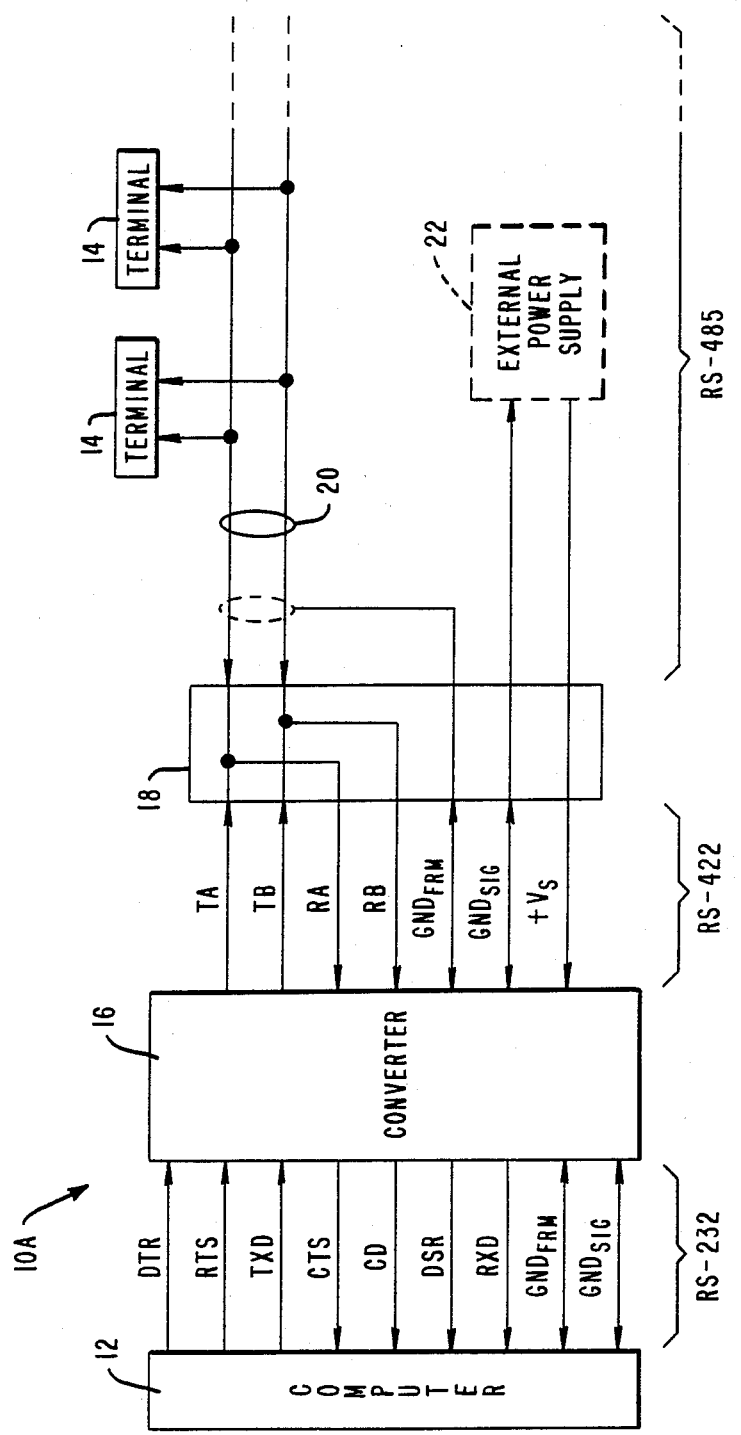
FIG. 3 is a block diagram showing a converter device in accordance with the present invention connecting a computer having an RS-232 interface to multiple terminals having an RS-485 interface.

FIG. 3 illustrates a data processing system 10A in which a computer 12 is connected by way of a converter device 16 to a plurality of terminals 14, each having an RS-485 interface. The converter device 16 is connected to the terminals 14 by way of a distribution box 18 which simply connects, as illustrated in FIG. 3, the signal line TA to the signal line RA, and the signal line TB to the signal line RB. As mentioned above, such a connection permits the use of the converter devise 16 to convert I/O signals in the RS-232 format at computer 12 to I/O signals in the RS-485 format at each of the terminals 14.

As illustrated diagrammatically in FIG. 3, the signal line GND $_{FRM}$ from converter device 16 is connected by distribution box 18 to the shield of a two-wire, bi-directional shielded cable 20 that connects distribution box 18 to the terminal 14. The signal lines GND $_{SIG}$ and $+V_S$ may be connected by the distribution box 18 to an external power supply 22 if such a power supply is needed for reasons mentioned earlier.

Figure 4:
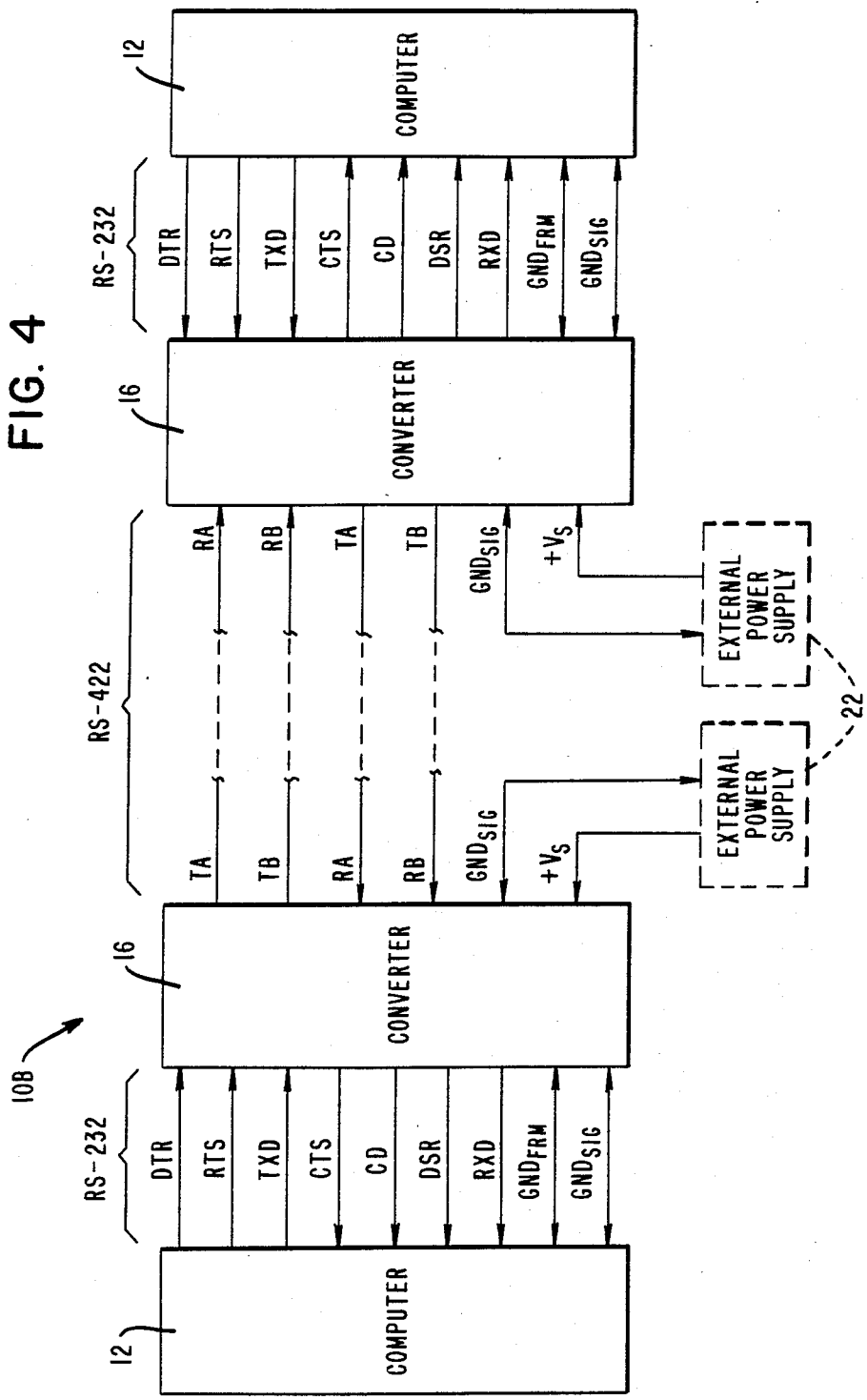
FIG. 4 is a block diagram showing converter devices in accordance with the present invention connecting two computers having RS-232 interfaces.

FIG. 4 illustrates yet another use for the converter device 16. In particular, there is shown in FIG. 4 a computer system 10B comprised of two computers 12 each having an RS-232 interface. As noted earlier, an RS-232 interface well suited for communications over distances greater than fifteen meters, and here it is contemplated that the computers 12 could be located a far as two miles apart. Each of the computers 12 has its RS-232 interface connected to a converter device 16, which converts the RS-232 signals from its respective computer to signals in the RS-422 format. Signal lines carry the RS-422 signals over the distance separating the computers 12. As also illustrated in FIG. 4, in those circumstances where an external power supply is needed for reasons mentioned earlier, an external power supply 22 could be connected to either or both of the converter devices 16 for purposes of providing the operating voltages needed at each of those devices. In the configuration shown in FIG. 4, the signal GND $_{FRM}$ on the RS-422 side of each of the converter devices 16 is not used since the frame or chassis ground of each computer 12 may be at a different potential because of the distances separating the computers 12.

Although the presently preferred embodiment has been described, it should be appreciated that, within the purview of the present invention, various changes may be made to the scope of the appended claims.

We claim:

1. In a converter device for interconnecting a first data processing system having input/output (I/O) signals conforming to a first communication standard, to a second data processing system having I/O signals conforming to a second communication standard, the improvement comprising:

deriving means for deriving an operating voltage for the converter device from at least one of the I/O signals of one of the first and second data processing systems; and external voltage connection means for connecting the converter device to an external power source for receiving an external power signal from which an operating voltage may be derived, so that an operating voltage for the converter device may be derived from either the one I/O signal or the external power signal.

2. The converter device of claim 1, wherein the I/O signals of the first data processing system include a control (DTR) signal having a high logic level, and wherein the deriving means comprises a diode and a capacitor, the diode having an anode for receiving the DTR signal and a cathode connected to the anode of the capacitor, with the cathode of the capacitor connected to a reference potential, so that in response to the high logic level of the DTR signal a relatively constant DC voltage appears across the capacitor.

3. The converter device of claim 2, wherein the deriving means further comprises a voltage regulator circuit having an input for receiving the DC voltage appearing across the capacitor, and an output for providing an operating voltage.

4. The converter device of claim 3, wherein the external voltage connection means comprises a terminal connected for providing the external power signal to the anode of the capacitor.

5. The converter device of claim 1, wherein one of the first and second communication standards is the EIA RS-232 standard.

6. The converter device of claim 5, wherein the other of the first and second communication standards is the EIA RS-422 standard.

7. In a converter device for interconnecting a first data processing device having an input/output (I/O) interface conforming to first communication standard to a second data processing device having an I/O interface conforming to a second communication standard, the improvement comprising:

voltage regulator means operatively connected for receiving an I/O signal from the first data processing device and converting the I/O signal into an operating voltage for operating the converter device; and terminal means connecting the voltage regulator means to an external power source so that the voltage regulator means may provide an operating voltage for operating the converter device independently of the I/O signal received at the voltage regulator means.

8. The converter device of claim 7, wherein the voltage regulator means comprises:

a capacitor;

a diode, with the diode having its anode connected for receiving the I/O signal, and its cathode connected to the anode of the capacitor, and with the cathode of the capacitor connected to ground; and a voltage regulator circuit having an input connected for receiving the voltage appearing across the capacitor and having its output providing the operating voltage for operating the converter device.

9. A converter device connected between a first device and a second device for converting input/output (I/O) signals between a first communication standard and a second communication standard, comprising:

first means for receiving from the first device I/O signals conforming to the first communication standard and converting such signals into I/O signals conforming to the second communication standard for the second device;

second means for receiving from the second device I/O signals conforming to the second communication standard and converting such signals into I/O signals conforming to the first communication standard for the first device;

third means for receiving at least one of the I/O signals of the first communication standard and storing the one I/O signal as a relatively constant DC voltage;

fourth means for receiving an external power signal and providing the external power signal to the third means; and fifth means for receiving the relatively constant DC voltage from the third means and providing at its output an operating voltage for operating the converter device.

10. The converter device of claim 9, wherein the I/O signals of the first communication standard include a control (DTR) signal having a predetermined high logic level, and wherein the third means comprises a diode and a capacitor, each having an anode and a cathode, with the anode of the diode receiving the DTR signal and the cathode of the diode connected to the anode of the capacitor, and with the cathode of the capacitor connected to a reference potential, so that in response to the high logic level of the DTR signal a relatively constant DC voltage appears across the capacitor.

11. The converter device of claim 10, wherein the I/O signals of the first communication standard include a second control (RTS) signal having a predetermined high logic level, and wherein the third means further comprises a second diode having its anode connected for receiving the RTS signal and its cathode connected to the anode of the capacitor.

12. The converter device of claim 9, wherein said fifth means comprises a voltage regulator circuit for receiving at its input the DC voltage from the third means and for providing at its output a positive operating voltage for the converter device.

13. The converter device of claim 12, wherein:

the converter device interconnects a first data processing system having I/O signals conforming to the first communication standard and a second data processing system having I/O signals conforming to the second communication standard;

the I/O signals of the first data processing system include a data (TXD) signal representing data to be transmitted from the first data processing system to the second data processing system, the TXD signal having a low logic level and a high logic level; and the converter device further comprises sixth means for providing a negative operating voltage, the sixth means including a third diode and a second capacitor, with the cathode of the third diode connected for receiving the TXD signal and with the anode of the third diode connected to the cathode of the second capacitor, and with the anode of the second capacitor connected to a reference potential, so that a negative operating voltage appears across the second capacitor in response to the low logic level of the TXD signal.

14. The converter device of claim 13, wherein the sixth means further includes an inverter circuit for receiving the positive operating voltage from the output of the voltage regulator circuit, and a fourth diode having its cathode for receiving the output of the inverter circuit and its anode connected to the cathode of the second capacitor.

15. The converter device of claim 14, further comprising an amplifier circuit for receiving the TXD signal from the first data processing system and providing at its output a pair of differential data signals representing data to be received at the second data processing system.

16. The converter device of claim 9, wherein the first communication standard is the EIA RS-232 standard.

17. The converter device of claim 16, wherein the second communication standard is the EIA RS-422 standard.

* * * * *